United States Patent [19]

Iwane et al.

[11] Patent Number: 5,614,983
[45] Date of Patent: Mar. 25, 1997

[54] AUTOMATIC FOCUS DEVICE AND METHOD

[75] Inventors: Toru Iwane, Yokohama; Shozo Yamano, Tokyo, both of Japan

[73] Assignee: Nikon Corporation, Tokyo, Japan

[21] Appl. No.: 496,661

[22] Filed: Jun. 29, 1995

[30] Foreign Application Priority Data

Aug. 31, 1994 [JP] Japan .................................. 6-206980

[51] Int. Cl.$^6$ ...................................................... G03B 3/00
[52] U.S. Cl. .............................................. 396/97; 396/133
[58] Field of Search ........................... 354/195.1–195.13, 354/400–409, 289.17, 106

[56] References Cited

U.S. PATENT DOCUMENTS

| | | | |
|---|---|---|---|
| 4,975,727 | 12/1990 | Ohtaka et al. | 354/402 |
| 5,162,836 | 11/1992 | Ishimaru | 354/410 |
| 5,258,795 | 11/1993 | Lucas | 354/289.12 |
| 5,412,448 | 5/1995 | Kunishige | 354/400 |
| 5,481,323 | 1/1996 | Egawa et al. | 354/106 |
| 5,495,312 | 2/1996 | Takagi | 354/402 |

*Primary Examiner*—Safet Metjahic
*Assistant Examiner*—Eric Nelson
*Attorney, Agent, or Firm*—Oliff & Berridge

[57] ABSTRACT

An automatic focus state detection device executes focus adjustment by taking environmental factors such as temperature and power source voltage into consideration. The temperature of the camera, the power source voltage of the battery in the camera, and the posture of the camera are detected. Then, lens driving times for six representative points of the driving lens distance are computed. A driving time table is produced, and the defocus amount is detected. Then, based on the updated driving time table, the lens driving time corresponding to the current defocus amount is computed. Finally, the timing for each sequential process from release to start of exposure is determined. In this manner, the driving time is computed by taking the temperature, the power source voltage, and the posture into consideration, and a more accurate estimation of the lens driving time is realized.

33 Claims, 8 Drawing Sheets

AUTOMATIC FOCUS DEVICE AND METHOD

FIELD OF THE INVENTION

The present invention relates to an automatic focus device that enables the focus lens provided in the shooting lens to track moving subjects without delay while taking into account environmental factors.

DESCRIPTION OF RELATED ART

Conventional automatic focus devices enable the focus lens within the shooting lens to track moving subjects without delay. Such devices estimate the time to drive the focus lens to the focus position (hereafter, lens driving time) based on the defocus amount. Then, based on the estimate, the devices determine the timing for each sequential camera process from releasing to completion of exposure. However, conventional lens driving time computations neglect environmental factors such as temperature and power source voltage.

The lens driving time corresponding to each defocus amount can be predetermined. For example, if the detected defocus amount is 3 mm and the predetermined lens driving time is 100 ms, then the timing for each sequential process such as mirror-up and mirror-down is controlled to guarantee completion of exposure within the lens driving time. Alternatively, the lens driving time is set to a constant value (worst case) regardless of the detected defocus amount, and that constant determines the timing for each sequential process.

Conventional automatic focus devices disregard temperature, power source voltage, and other environmental factors. Thus, the estimated lens driving time differs by a large amount from the actual lens driving time. The following are at least some reasons for such differences.

The automatic focus lens driving unit that drives the automatic focus lens includes many mechanical parts such as a motor, gears and cams. Lubricant oil guarantees smooth operation as well as the required accuracy of each part. However, lubricant oil changes viscosity with temperature. As the temperature becomes higher, the oil viscosity becomes lower. As the temperature becomes lower, the oil viscosity becomes higher. Therefore, in general, the lower the temperature, the more difficult it becomes to drive each mechanical part, while the higher the temperature, the easier it becomes to drive each mechanical part.

Additionally, many gears are made of synthetic resins with heat expansion and shrinkage ratios larger than metal parts. As a result, when the temperature rises the synthetic resin gears expand and become harder to drive. Conversely, when the temperature falls, the gears shrink and become easier to drive. The driving efficiency and the friction force of mechanical parts change with temperature and cause the estimated lens driving time of the focus lens to differ substantially from the actual measurement.

Further, the posture of the automatic focus device considerably affects the automatic focus lens driving unit. When the optical axis of the shooting lens is parallel to the ground, the effect of gravity is different than when the optical axis is vertical to the ground. Therefore, the lens driving time varies with camera posture for a given distance.

Furthermore, the motor inside the focus lens driving unit receives power source voltage from the camera battery power source. The internal resistance of a battery changes with temperature, and the generated power source voltage varies with the internal resistance. As the temperature falls, the internal resistance of a battery increases causing the power source voltage to decrease. Additionally, the longer the battery is in continuous use, the lower the power source voltage falls. A drop in the power source voltage decreases the driving capability of the focus lens driving unit.

Therefore, the driving capability of the focus lens driving unit changes with environmental factors such as temperature, posture, and power source voltage. Conventional automatic focus devices are not equipped with an effective means to detect and evaluate the effects of environmental factors. Therefore, conventional automatic focus devices consider every possible condition and assume the worst conditions to determine each sequential process time from release to exposure. In any environmental condition, whether the temperature is high or low, for example, the driving of the focus lens is estimated to match the worst condition. Hence, in the case when environmental conditions are good (for example, temperature 20° C.), each sequential process is executed quicker than estimated, and photographers are forced to wait for unnecessary and lengthy intervals of time. In such a case, the function of the automatic focus device is not fulfilled.

A camera's continuous shooting capability, or how many pictures can be taken in one second, has become important in recent years. Therefore, reducing the time to process each sequence from mirror-up to exposure is desired. However, in a conventional automatic focus device, an assumption of the worst case scenario determines each sequential process time and limits continuous shooting speed.

SUMMARY OF THE INVENTION

It is an object of the present invention to provide an automatic focus device capable of fast and accurate focus adjustment regardless of temperature and power source voltage by including environmental factors such as temperature, posture and power source voltage in executing focus adjustment.

The automatic focus device includes a defocus amount detection unit, an environment factor measurement device, a focus lens, a driving device, and a driving capability estimator. The defocus amount detection unit detects the defocus amount of a shooting lens against a subject. The driving device drives the focus lens to the focus position based on the defocus amount detected. The environmental factor measurement device measures environmental factors, such as temperature and power source voltage, which affect the driving speed or the driving time of the focus lens. The driving capability estimator estimates the driving capability of the driving device in driving the focus lens based on the results of the measured environmental factors.

The environmental factor measurement device of the automatic focus device can also measure at least one factor of power source voltage, temperature, and posture. Based on the results of the measurement and the defocus amount detected, the driving time estimator estimates the time required to drive the focus lens to the focus position, (i.e., the lens driving time). Based on the estimated lens driving time, a timing determination device determines various timings related to photographing such as the driving starting time of the focus lens, the mirror-up starting time, the exposure starting time, the film feeding starting time and the mirror-down starting time.

To improve calculation speed, the automatic focus device can include a standard driving time computation unit to compute the driving time corresponding to a plurality of predetermined defocus amounts based on measuring at least one factor among power source voltage, temperature and posture. The driving time estimator estimates the driving time corresponding to the specific defocus amount detected by the defocus amount detection unit based on the results (interpolated) of the computation by the standard driving time computation unit. The driving times corresponding to a plurality of predetermined defocus amounts can be computed, for example, based on linear functions that use as a parameter at least one factor among power source voltage, temperature, and posture.

Further, the automatic focus device can locate the standard driving time computation unit in either of the lens side or the camera body side of the camera. After locating the standard driving time estimator in one side, the driving time estimator can be located in the other side. Communication devices are included on both the lens side and the camera body side to enable data communication between both sides. The data communications could include at least the standard driving times computed by the standard driving time computation unit or the driving time estimated by the driving time estimator.

Alternatively, the automatic focus device can incorporate environmental factors by measuring the effect on the feeding time of a frame of film. As the power source voltage of the battery drops, the film feeding time increases. As the temperature changes, the lubrication oil viscosity increases thereby increasing torque on the motor in the film feeding unit and impacting the feeding time for frame of film. Therefore, detecting the feeding time of a frame of film is substantially equivalent to detecting the power source voltage of the battery and temperature.

Thus, the automatic focus device can include a defocus amount detector, a feeding time detection unit, a focus lens, a driving device, a driving speed estimator, and a timing determination unit. The defocus amount detection unit detects the defocus amount of the shooting lens against a subject. The driving device drives the focus lens to the focus position based on the defocus amount detected. The feeding time measuring device measures the feeding time to wind one frame of film. The driving speed estimator estimates the driving time to drive the focus lens to the focus position based on the measured feeding time and the detected defocus amount. Based on the results of the estimated driving time, the timing determination unit determines the various timings related to photographing, such as the driving starting time of focus lens, the mirror-up starting time, the exposure starting time, the film feeding starting time, and the mirror-down starting time.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
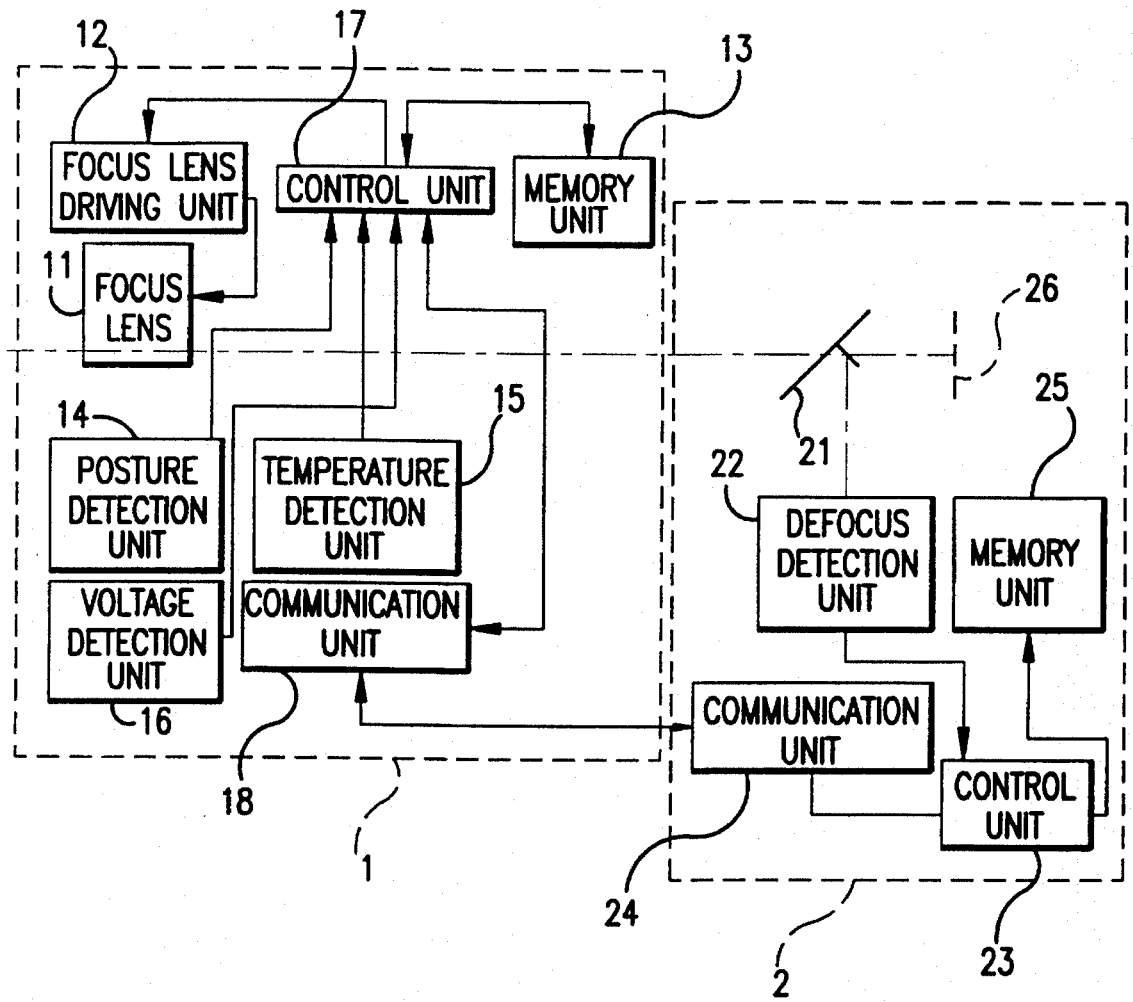
FIG. 1 is a schematic diagram showing an automatic focus device according to one embodiment of the present invention.

A first embodiment of the automatic focus device according to the present invention will be explained in reference to FIGS. 1–7. The first embodiment describes the automatic focusing device applied to a camera.

The defocus amount detection unit corresponds to the defocus detection means, and the focus lens driving unit 12 corresponds to the driving means. Further, the posture detection unit 14, the temperature detection unit 15, and the voltage detection unit 16 correspond to the environmental factor measuring means. The control units 17, 23 correspond to the driving capability estimation means. Step S104 in FIG. 6 corresponds to the driving time estimation means. Step S105 in FIG. 6 corresponds to the timing determination means. Step S4 in FIG. 5 corresponds to the standard driving time computation means, and the communication units 18, 24 correspond to the communication means. Finally, the feeding time detection unit 102 corresponds to the feeding time measurement means.

Figure 2:
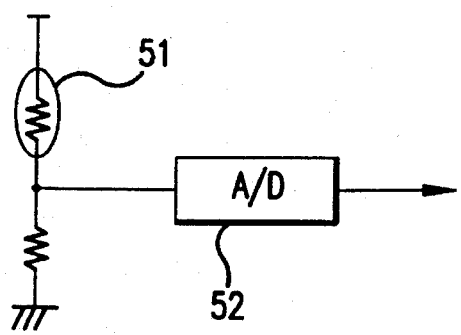
FIG. 2 is a circuit diagram showing the internal structure of the temperature detection unit according to one embodiment of the present invention.

FIG. 1 is a schematic diagram of a first embodiment. Shooting lens I side includes a focus lens 11, a focus lens driving unit 12, a memory unit 13, a posture detection unit 14, a temperature detection unit 15, a voltage detection unit 16, a control unit 17, and a communication unit 18. The focus lens 11 moves along the optical axis of the shooting lens 1, and focus adjustment is executed by moving the focus lens 11 as instructed by the control unit 17. The focus lens driving unit 12 includes a motor (not shown) and controls the driving direction, driving speed, and driving amount of the focus lens 11. The memory unit 13 memorizes information unique to the shooting lens 1, such as the driving characteristic data of the shooting lens 1. The posture detection unit 14 includes, for example, a mercury switch and a gyro (neither shown) for detecting the posture and inclination of the camera. As shown in FIG. 2, the temperature detection unit 15 includes, for example, a thermistor 51 and an A/D converter 52 for detecting the temperature of the camera. The voltage detection unit 16 detects the power source voltage of the camera battery (not shown). The control unit 17 executes at least the processes shown in FIG. 5, see explanation below. The communication unit 18 communicates data with the camera body 2.

Camera body 2 includes a quick return mirror 21, a defocus detection unit 22, a control unit 23, a communication unit 24, and a memory unit 25. Light rays from the subject penetrate or reflect through quick return mirror 21. Defocus detection unit 22 detects the defocus amount, which refers to the relative image surface shift between the focus detection light ray composing surface for light that passes through shooting lens 1 and the predicted focus surface 26 equivalent to the film surface. Control unit 23 executes at least the processes in FIG. 6, see explanation below. Communication unit 24 communicates data with the shooting lens 1, and memory unit 25 stores computation results and the like.

In a first embodiment, the control unit 17 in the shooting lens I computes the time required to drive the focus lens 11 to the focus position (lens driving time) based on the temperature of the camera, the power source voltage of the battery, the posture of the camera, and the actual defocus amount. Then, the focus lens driving unit 12 drives the focus lens 11 based on the computed lens driving time. However, stopping the focus lens 11 exactly on the focus position becomes difficult when the focus lens is driven rapidly and thus generates momentum. Therefore, the focus lens 11 is driven slowly in the vicinity of the focus position, and most of the focus lens 11 driving time spent in deceleration.

Thus, the relationship between the distance that the focus lens 11 travels, from the current position to the focus position, and the lens driving time is not a proportional relationship. Rather, the relationship is the exponential function in Formula (1).

$$x = k_1 e^{-k_2(t-t_0)} \quad (1)$$

In Formula (1), k1 and k2 are constants determined by the type of shooting lens, t is the lens driving time, and x is the lens driving distance.

Figure 3:
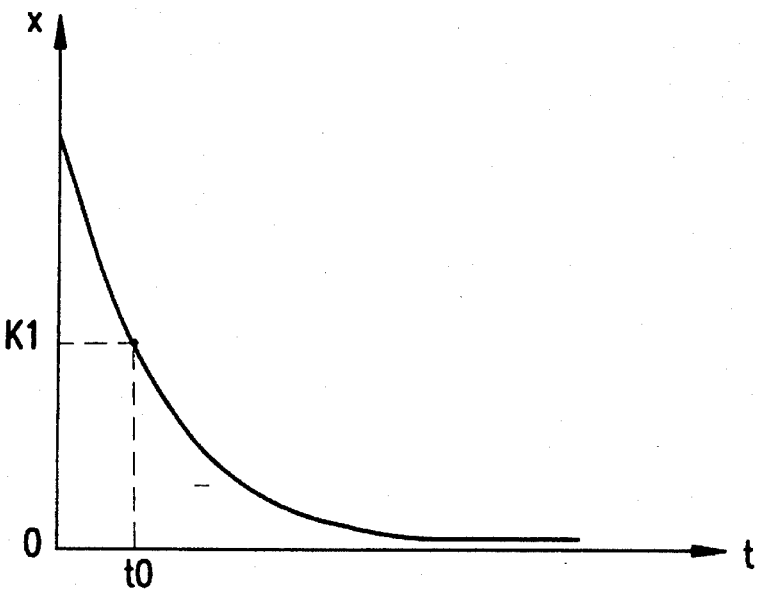
FIG. 3 is a drawing showing the relationship between lens driving time and lens driving distance.

FIG. 3 is a graph of Formula (1). If k1 represents the lens driving distance corresponding to the defocus amount at time $t_0$, the lens driving distance changes rapidly for some time after time $t_0$ because the focus lens 11 is moving very fast toward the focus position. When the focus lens 11 approaches the focus position, the lens driving distance approaches 0. Then, deceleration takes a considerable amount of time before the lens driving distance is sufficiently close to 0.

Formula (2) is obtained by modifying Formula (1). In Formula (2), $l_0$, $l_1$ and $l_2$ are constants.

$$t = l_0 + l_1 \log \frac{x}{l_2} \quad (2)$$

According to Formula (2), if the lens driving distance x is predetermined, the lens driving time for that distance is known.

Formula (3) is obtained by substituting actual numerical values into Formula (2).

$$t = 80 + 17.4 \log \frac{x}{3} \quad (3)$$

Formula (3) represents a case where the focus lens 11 driving time is at least 80 ms when the defocus amount detected by the focus amount detection unit is 3 mm, regardless of environmental factors such as temperature.

In Formula (3), assuming that the temperature of the camera, the power source voltage of the battery, and the posture of the camera effect the lens driving time linearly, the relationship of these factors is given by Formula (4).

$$t = \left( 80 + 17.4 \log \frac{x}{3} \right) (1 + 0.125(6.5 - E) + 3.13 \times \quad (4)$$

$$10^{-3}|20 - T| + I)$$

In Formula (4), E is the power source voltage of the battery, T is the temperature of the camera, and I is the posture of the camera. In Formula (4), the ideal voltage of the battery is set at 6.5 V, and the ideal temperature is set at 20° C.

Figure 4:
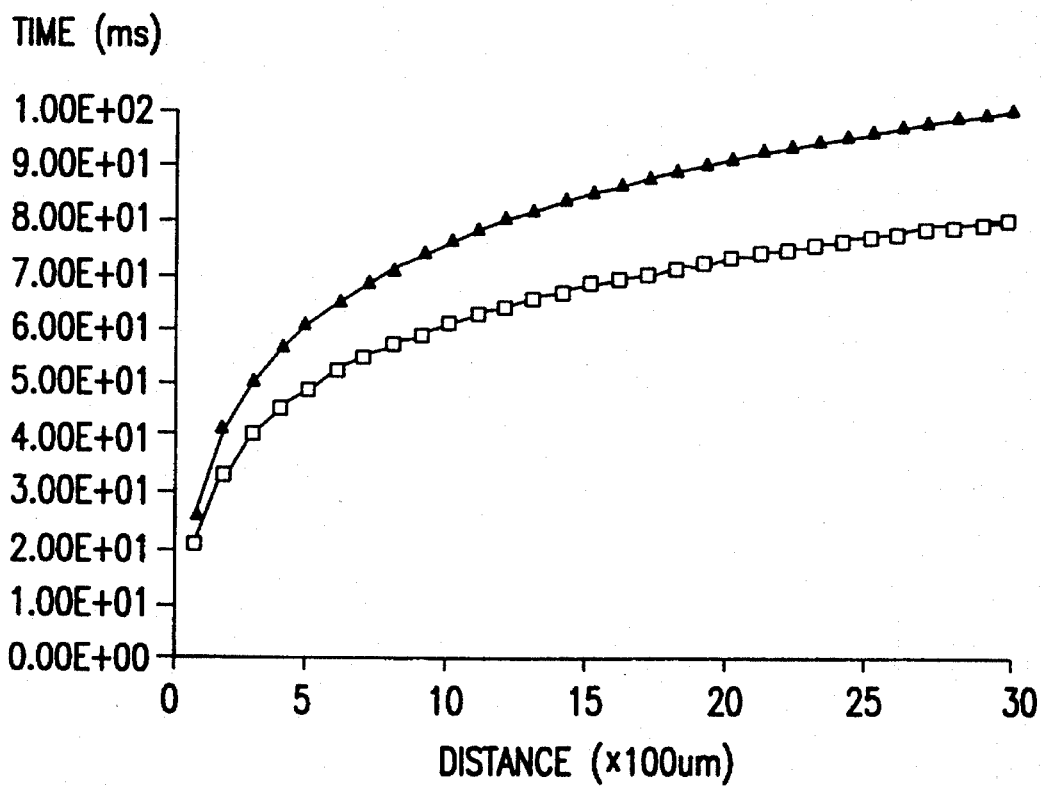
FIG. 4 is a drawing showing a relationship between lens driving distance and lens driving time.

The square plots in FIG. 4 are a graph of Formula (4). The triangle plots in FIG. 4 are a graph that represents a case where the defocus amount is 3 mm and the lens driving time is 100 ms.

Figure 5:
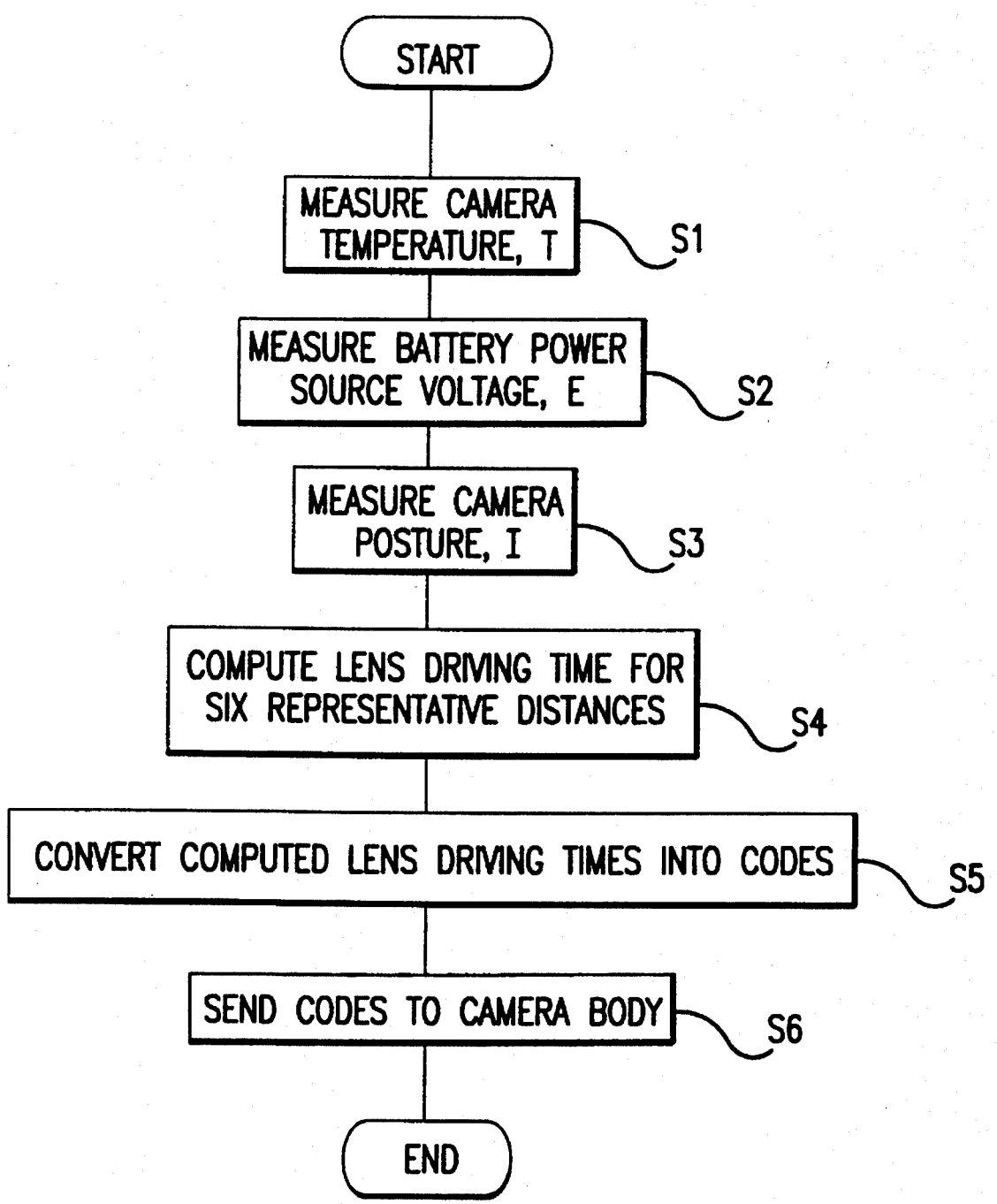
FIG. 5 is a flow chart showing the operation of the control unit inside the shooting lens according to one embodiment of the present invention.
Figure 6:
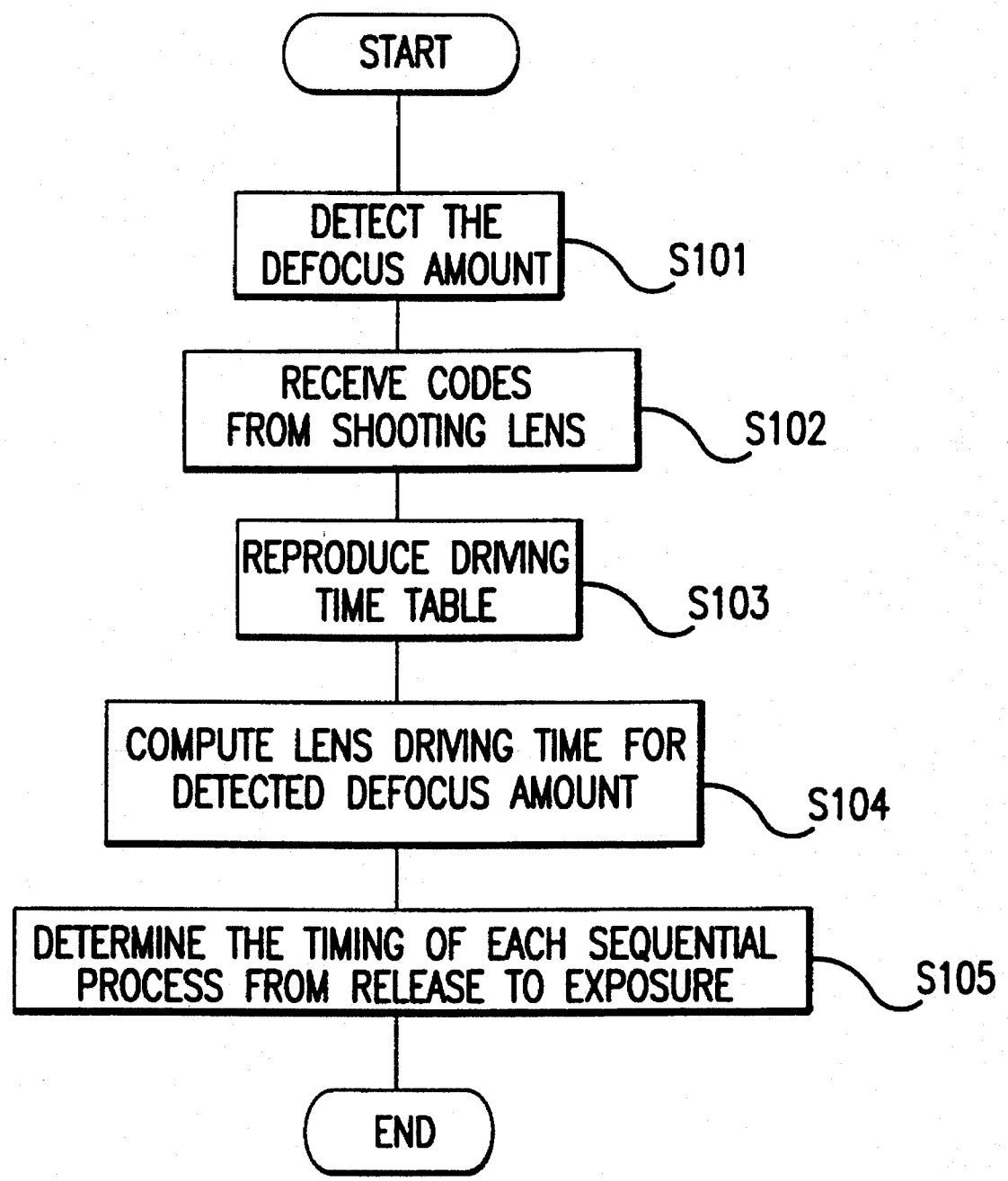
FIG. 6 is a flow chart showing the operation of the control unit inside the camera body according to one embodiment of the present invention.

FIG. 5 is a flow chart showing the operation of the shooting lens I control unit 17. FIG. 6 is a flow chart showing the operation of the camera body 2 control unit 23. Operations of the first embodiment will be explained based on these flow charts.

In step S1, as shown in FIG. 5, the temperature T of the camera is measured based on the detection results of the temperature detection unit 15. For example, the thermistor 51 resistance varies with temperature, which changes the voltage value into the A/D converter 52. Thus, digital values that change according to the temperature are entered into the control unit 17. Moreover, because temperatures usually change slowly, camera temperature based on the results of temperature detection continuously over a long period of time using an integral A/D converter and the like are preferred. Output from the A/D converter 52 is expressed as an exponential function with temperature as a parameter. The result is converted to Celsius by the control unit 17 and assigned as the camera temperature T.

In step S2, the power source voltage E of the battery is measured based on the detection results by the voltage detection unit 16. Since the voltage detection unit 16 outputs analog voltage values, the values are converted to digital values by an A/D converter (not shown), before the values are read into the control unit 17.

The power source voltage of the battery changes frequently according to the amount of processing in the camera, such as film feeding and photometry. Thus, a shorter time period than in temperature detection is desired when detecting voltage. In other words, the power source voltage is preferably detected for each process of the camera.

Additionally, the power source voltage of the battery is easily affected by noise. Also, the power source voltage can change sharply and momentarily generating spike-like high frequency pulses when various switches are thrown. Therefore, if the time period of power source voltage detection is too short, the voltage value cannot be detected accurately. Thus, detecting power source voltage continuously over a certain time period, for example, and obtaining the average of the detection results is preferred. Moreover, data converted to digital values by the A/D converter should not be read directly into control unit 17, but should be read after removing high frequency pulses through a low pass filter of about 100 Hz.

In step S3, the posture I of the camera is measured based on detection results of the posture detection unit 14. A photographer can take a picture by inclining the camera at many angles. Detecting every posture of the camera is difficult. Hence, the posture of the camera is detected by the angle of the optical axis of the shooting lens I from the horizontal direction, as shown in FIG. 7(a) and the angle of the rotation of the camera around the optical axis, as shown in FIG. 7(b).

Figure 7A:
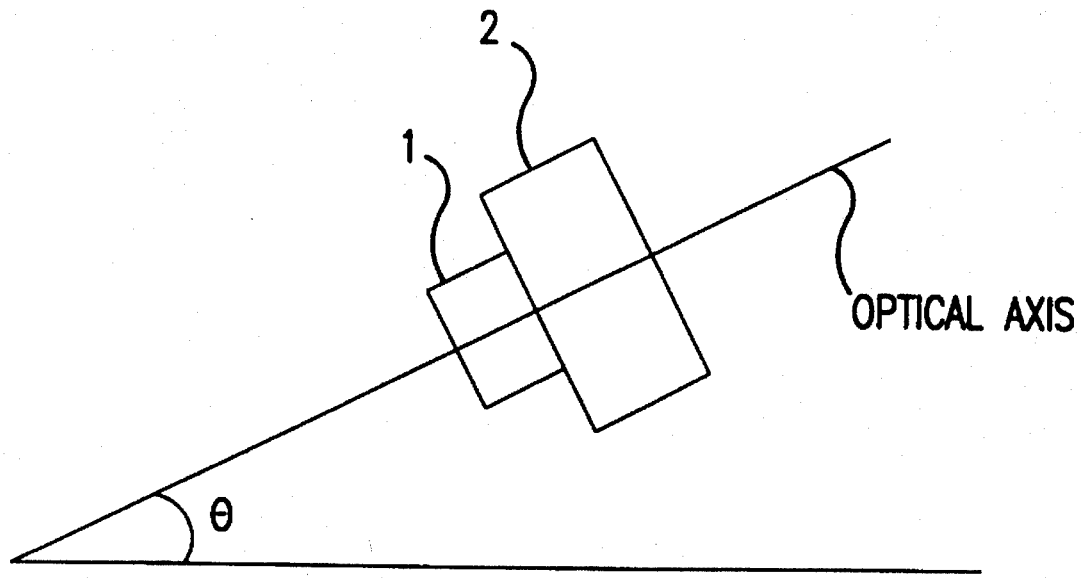
FIGS. 7(a) and (b) illustrate changes in posture of a camera.

When the camera is inclined with an angle of Θ in the direction as shown in FIG. 7(a), the focus lens driving unit 12 receives a gravitational effect proportional to (1−cos Θ). The gravitational effect causes a change in the driving torque. The magnitude of the actual gravitational force depends on the type of shooting lens I used. Therefore, a standard amount p representing the gravitational effect is stored beforehand in the memory unit. Hence, the product of (1−cos Θ) and the standard amount p is the effect I1 caused by the posture change as shown in FIG. 7(a).

Figure 7B:
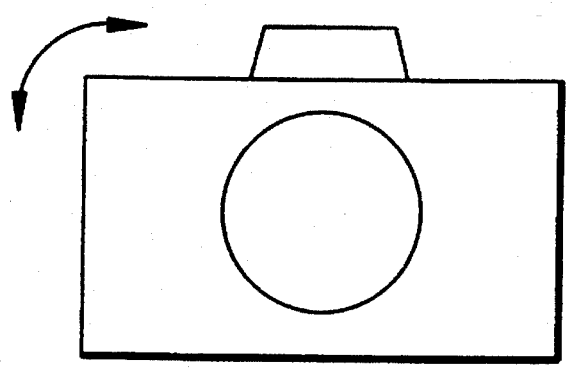

On the other hand, when the camera is rotated by an angle of Θ in the direction as shown in FIG. 7(b), the focus lens driving unit 12 is effected by the uneven torque of the lens ring. The uneven torque of the lens ring causes the driving torque to change. In other words, the load on the exterior surface of the lens ring is not uniform, but is the same as hanging a bob equivalently at one part of the exterior surface. Hence, when the camera is rotated in the direction as shown in FIG. 7(b), the driving torque changes with the angle of rotation.

To calculate the positive change effect, d is the rotational position of the current lens ring (subject distance indicated by the lens ring); s is a function unique to the lens and converts the subject distance d to the rotational angle of the lens ring; $\phi$ is a rotational angle of the camera in the direction as shown in FIG. 7(b); R is a function indicating the effect of the uneven torque corresponding to the rotational angle; and I2 is the effect caused by posture change in the direction as shown in FIG. 7(b) and is expressed by Formula (5).

$$I2=(R\{s(d)+\phi\}\cos Θ) \quad (5)$$

In Formula (5), function R is obtained by computation, or a table can be constructed based on the results of pre-measurement. A table of results for R can be stored in the memory unit 13.

I1 and I2 are posture changes in the direction as shown in FIGS. 7(a) and 7(b), respectively. The final effect I caused by the change in posture of the camera is obtained by adding the effects I1 and I2.

In step S4, the lens driving time is computed for at least several preassigned representative points by substituting the temperature T of the camera measured at step S1, the power source voltage E detected at step S2, and the posture I of the camera detected at step S3, respectively, into Formula (4). For example, six points can be selected with a lens driving distance of geometric intervals such as 100 microns (μm or μ), 200μ, 400μ, 800μ, 1600μ, and 3200μ. Using Formula (4) and these points as representative points, six lens driving times are computed. The lens driving distance of the representative points is not limited to the above example, i.e., 1600μ can be replaced by 1500μ and so on.

In step S5, each representative lens driving time computed at step S4 is changed into code to eliminate redundancy. Also, the data amount is compressed. For example, a method of encoding is to quantize data by multiplying 5 ms to the lens driving time when the lens driving time is 800μ or less, and by multiplying 10 ms to the lens driving time when the lens driving time is 1600 μor more, thus converting each lens driving time into 4-bit binary codes. In this manner, the total data amount is only 4 bits×6=24 bits (3 bytes) to send six different lens driving times to the camera body 2. Thus, the time required for data communication is reduced as well as the load during communication.

In step S6, the codes converted in step S5 are sent to the camera body 2.

Steps S5 and S6 send the lens driving time data corresponding to the representative value of the lens driving distance to the camera body 2. Equally effective steps could be receiving the actually measured value of the defocus amount from the camera body 2, computing the lens driving time using Formula (4), and sending back the results of the computation to the camera body 2. In this case, the code conversion step, step S5, is not especially necessary, but two way data communication between the camera body 2 and the shooting lens 1 must be established. Two way communication may cause at least problems of increased data communication load because of an increase in the number of communication lines and increased timing control difficulty.

The processing of the control unit 23 in the camera body 2 is described with reference to FIG. 6. In step S101, the defocus amount is detected by the defocus amount detection unit 22. A phase shift detection method that is well known in the prior art and the like is used to detect the defocus amount. Thus, a detailed explanation is omitted.

In step S102, the camera body control unit 23 receives codes sent from the shooting lens 1 through the communication unit 18 indicating the lens driving times for six representative points.

In step S103, the received codes are converted to the original lens driving time data, and the driving time table (relationship of the lens driving time to the lens driving distance for six representative points) is reproduced. In other words, each time step S103 is executed, the data in the driving time table are updated. Here, the driving time table is stored in the memory unit 25.

In step S104, the lens driving time corresponding to the current defocus time detected at step S101 is computed based on the driving time table. The computation can be executed by interpolation, extrapolation, and other linear interpolation methods using the data in the driving time table. For example, if the lens driving distance corresponding to the current defocus amount is 250μ, the lens driving time corresponding to 250μ may be obtained by linear interpolation of the lens driving distance data for 200μ and 400μ.

Computing the lens driving time using interpolation or extrapolation, instead of linear proportional interpolation, is also effective after changing the lens driving distance to lens driving time exponential relationship into a non-linear one by converting into logarithmic values the lens driving time data in the driving time table.

In step S105, the timing of each sequential process from release to exposure is determined based on the lens driving time computed in step S104. In other words, the time to start the driving of the focus lens 11 after release, the time to start mirror-up of the quick return mirror 21, the time to mirror-down, and the time to start exposure and the like are determined.

To summarize the operation of the first embodiment at the shooting lens I side, the temperature of the camera, the power source voltage of the battery in the camera, and the posture of the camera are detected. The lens driving times corresponding to six representative points of lens driving distance are computed using Formula (4). The results of the computation are converted into 4-bit codes and sent to the camera body 2. At the camera body 2 side, the defocus amount is detected, and the driving time table is reproduced after receiving the codes sent from the shooting-lens 1. The lens driving time corresponding to the current defocus amount is computed. Finally, the timing for each sequential process from release to exposure is determined.

In the first embodiment, the lens driving time corresponding to the actual defocus amount is computed by taking the temperature of the camera, the power source voltage of the battery in the camera, and the posture of the camera into consideration. Therefore, the lens driving time estimate is more accurate than in conventional methods. In other words, even if the viscosity of the lubrication oil changes because of temperature changes, or the driving capability of the focus lens driving unit 12 declines because of dropping power source voltage of the battery, or any other environmental condition changes, the lens driving time is always estimated accurately because these changes are incorporated into the estimate.

In a second embodiment, temperature changes of the camera and power source voltage changes of the battery are detected indirectly by detecting the film feeding time. An explanation of the second embodiment follows.

Figure 8:
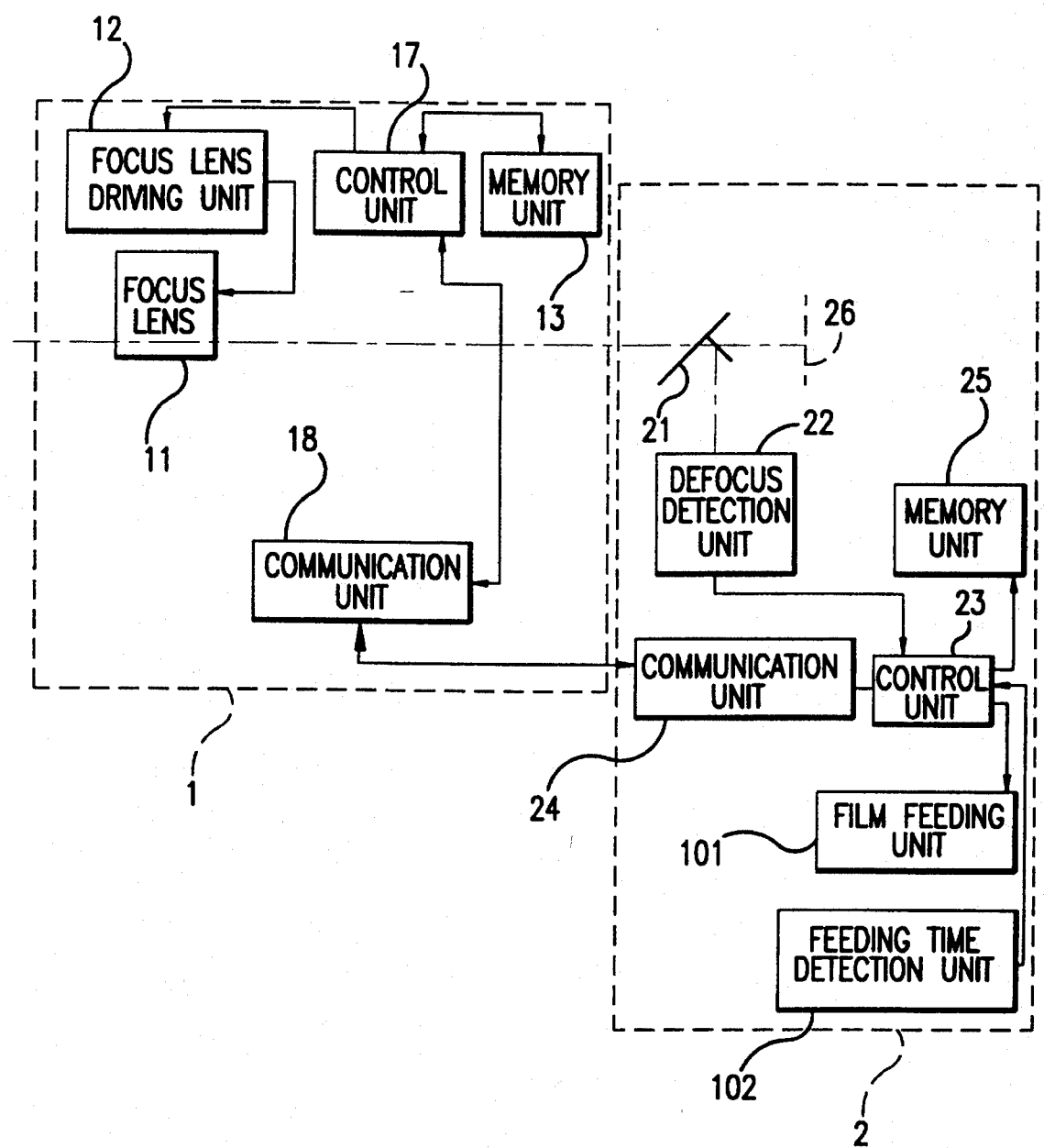
FIG. 8 is a block diagram showing the automatic focus device according to another embodiment of the present invention.

As shown in FIG. 8, the shooting lens 1 does not include a temperature detection unit, a voltage detection unit, and a posture detection unit. A film feeding unit 101 to control film winding and a feeding time detection unit 102 to detect the time required to wind one frame of film are included in the camera body 2. The feeding time detection unit 102 detects the time to feed film from the previous frame position to the initial frame position for the first shooting after film is installed. In subsequent shooting, the feeding time detection unit 102 detects the film feeding time required to feed the film immediately preceding the frame.

Next, the relationship between film feeding time and lens driving time will be explained. The film feeding unit 101 includes a direct current motor (not shown), and the camera battery supplies power source voltage directly to the direct current motor. The film feeding unit 101 drives the direct current motor by the so-called open driving method that is well known in the art.

As the power source voltage of the battery drops, the number of rotations of the direct current motor decreases nearly linearly because of the characteristics of a direct current motor. Therefore, the film feeding time increases nearly linearly. The power source voltage, the number of rotations of the direct current motor, and the reciprocal of the film feeding time are directly proportional. Therefore, information relating to the power source voltage of the battery can be obtained by detecting the number of rotations of the direct current motor.

Further, if the temperature drops, (i) the resistance inside the battery increases, and (ii) the viscosity of the lubrication oil increases. However, (i) can be considered part of the power voltage drop explained before and is not explained separately. On the other hand, (ii) causes an increase in driving torque of the direct current motor (not shown) in the film feeding unit 101. The change in driving torque and the number of rotations of the direct current motor are virtually proportional. Therefore, information relating to the temperature of the camera can ultimately be obtained by detecting the number of rotations of the direct current motor.

Detecting the film feeding time by the feeding time detection unit 102 enables detection of the number of rotations of the direct current motor (not shown) in the film feeding unit 101. As described above, detecting the number of rotations of the direct current motor is equivalent to detecting the power source voltage of the battery and the temperature of the camera. By detecting the film feeding time, the values corresponding to the second and the third linear terms in Formula (4) can be obtained.

Thus, Formula (6) replaces Formula (4) in the second embodiment to compute the lens driving time.

$$t = \left( 80 + 17.4 \log \frac{x}{3} \right) (1 + a(t_x - t_0)) \quad (6)$$

In Formula (6), $t_0$ denotes the film feeding time under standard or favorable conditions, and $t_x$ denotes the actually measured value of film feeding time. Moreover, a in Formula (6) is a constant. From past experience, the preferred value of a is $2.5 \times 10^{-3}$ when the unit of time is ms. Formula (6) does not incorporate the effect of change in camera posture.

Figure 9:
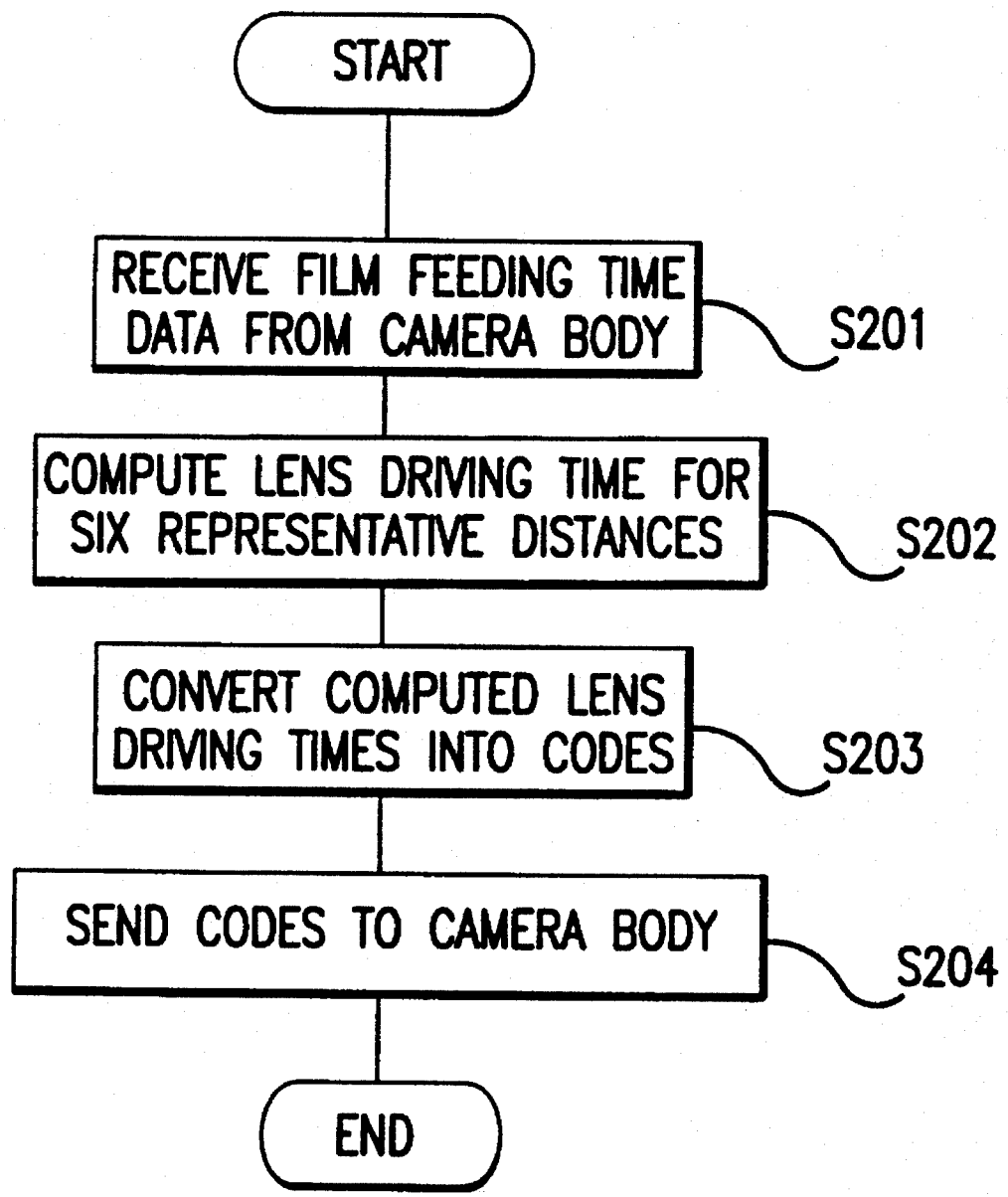
FIG. 9 is a flow chart showing the operation of the control unit inside the shooting lens according to another embodiment of the present invention.
Figure 10:
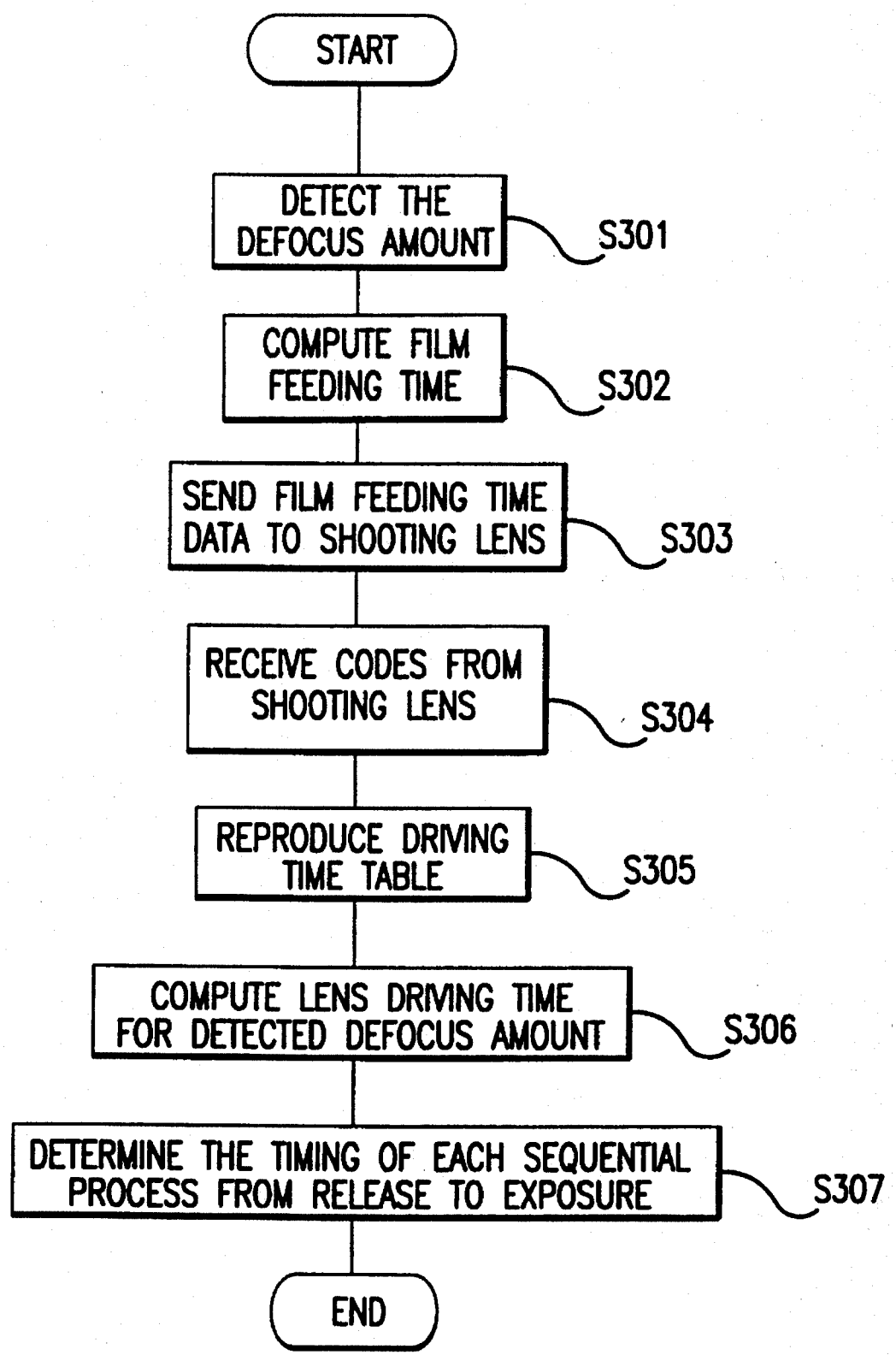
FIG. 10 is a flow chart showing the operation of the control unit inside the camera body according to another embodiment of the present invention.

FIG. 9 shows the operation of the control unit 17 in the shooting lens 1, and FIG. 10 shows the operation of the control unit 23 in the camera body 2 according to the second embodiment. The operation of the second embodiment will now be explained with reference to FIGS. 9 and 10.

In step S201 in FIG. 9, film feeding time data sent from the camera body 2 are received through the communication unit 18. In step S202, the lens driving times corresponding to each of six representative points of lens driving distance are computed using Formula (6). In steps S203 and S204, the lens driving times computed are converted into codes and sent to the camera body 2. The processing is executed identical to steps S5 and S6 in FIG. 5 and as explained above.

FIG. 10 shows the processing of the control unit 23 in the camera body 2. In step S301, the defocus amount is detected identical to step S101 in FIG. 6. In step S302, the film feeding time is computed. In step S303, the film feeding time data are sent to the shooting lens 1 through the communication unit 24.

Codes indicating the lens driving times for the representative points are sent from the shooting lens 1 to the camera body 2. In step S304, the codes are received. In steps S305–S307, the driving time table is reproduced after converting the codes into the original lens driving time data identical to steps S103–S105 in FIG. 6. Then in step S307, the timing of each sequential process from release to completion of exposure is determined, and the operation is complete.

To summarize the operation of the second embodiment, the film feeding time is measured first by the camera body 2, and the results are sent to the shooting lens 1. In the shooting lens 1, lens driving times are determined for six representative points based on Formula (6) then converted into codes and sent to the camera body 2. Based on the lens driving time data received, the camera body 2 side produces a driving time table for the six representative points and determines the timing for each sequential process from release to completion of exposure.

In the second embodiment, as described above, the lens driving time is computed based on the difference between the standard value and the actually measured value of the film feeding time. The lens driving time, taking the effects of changes in the temperature and in the power source voltage into consideration, is computed without directly measuring the temperature of the camera and the power source voltage of the battery. Thus, the burden of detecting the temperature and the power source voltage is eliminated. Therefore, the second embodiment has simpler operations and easier and faster computation of the lens driving time than the first embodiment.

The second embodiment computes the lens driving time easier than the first embodiment, but both embodiments can be used together. If processes in the first embodiment are used as a base, the lens driving time obtained by the second embodiment can supplement the lens driving time obtained by the first embodiment. Alternatively, the first and second embodiments can be freely interchangeable depending on environmental conditions. In the first embodiment, the shooting lens 1 includes the temperature detection unit 15, the voltage detection unit 16, and the posture detection unit 14, but these elements could be included in the camera body 2. Then, the results of temperature detection would be sent from the camera body 2 to the shooting lens 1 prior to computation of the lens driving time for the representative points. Also, the order and methods of temperature, voltage, and posture detection are not limited to the disclosed embodiments.

Further, the lens driving times for the representative points can be computed by the control unit 23 of the camera body. Both embodiments compute the lens driving time based on Formulae (4) or (6), but the algorithm for the lens driving time is not limited to these equations. For example, the lens driving time can be computed using nonlinear equations for the relationship between lens driving time and the effects of the camera temperature, the power source voltage of the battery, and the camera posture.

Moreover, the structure of the interior of the camera, including the temperature detection unit 15, the voltage detection unit 16, and the posture detection unit 14 as shown in FIG. 1, is not limited to that embodiment.

The embodiments described in detail above estimate the driving capability of the driving means in driving the focus lens based on the driving speed of the focus lens and the results of measuring environmental factors that affect the driving time. Therefore, an accurate estimation of driving capability that is not influenced by changes in temperature or power source voltage is obtained.

As many different embodiments of this invention may be made and used without departing from its spirit and scope, it is understood that the invention is not limited to the specific embodiments.

What is claimed is:

1. An automatic focus device, comprising:
    a defocus amount detection device for detecting a defocus amount of a shooting lens against a subject;
    a focus lens;
    a driving device coupled with said focus lens, said driving device driving said focus lens to a focus position based on said detected defocus amount;
    an environmental factor measurement device that measures at least one environmental factor affecting a driving time of said focus lens; and
    a driving time estimation device communicating with said environmental factor measurement device, said driving time estimation device estimating a driving time of said driving device based on said at least one measured environmental factor.

2. An automatic focus device according to claim 1, wherein said environmental factor measurement device comprises a feeding time measuring device that measures a feeding time to wind a frame of film.

3. An automatic focus device according to claim 2, wherein said environmental factor measurement device further comprises at least one sensor that detects said at least one environmental factor.

4. An automatic focus device according to claim 1, wherein said environmental factor measurement device comprises at least one sensor that detects said at least one environmental factor.

5. An automatic focus device according to claim 1, wherein said environmental factor measurement device measures at least one of a power source voltage of said automatic focus device, a camera temperature, and a camera posture.

6. An automatic focus device according to claim 1, further comprising a timing determination device that determines a driving starting time of at least said focus lens.

7. An automatic focus drive according to claim 6, wherein said timing determination device determines at least a mirror-up starting time, an exposure starting time, a film feeding starting time, and a mirror-down starting time based on said estimated driving time.

8. An automatic focus device according to claim 1, further comprising a standard driving time computation device that computes a driving time for each of a plurality of predetermined defocus amounts based on said at least one environmental factor, wherein said driving time estimation device estimates said driving time corresponding to said detected defocus amount based on said plurality of predetermined defocus amounts computed by said standard driving time computation device.

9. An automatic focus device according to claim 8, comprising six of said plurality of predetermined defocus amounts, wherein each of said computed driving times for said six predetermined defocus amounts is converted into a four bit code.

10. An automatic focus device according to claim 8, wherein said standard driving time computation device computes each of said computed driving times for said plurality of predetermined defocus amounts based on linear and nonlinear functions that use as a parameter said at least one environmental factor.

11. An automatic focus device according to claim 10, further comprising a communication unit on both a lens side and a camera body side for enabling data communication between said lens side and said camera body side, wherein said standard driving time computation device is located in one of said lens side and the camera body side, and wherein said driving time estimation device is located in the other of said lens side and camera body side.

12. An automatic focus device for a camera, comprising:
    defocus amount detection means for detecting a defocus amount of a shooting lens against a subject;
    a focus lens;
    driving means for driving said focus lens to a focus position based on said defocus amount detected;
    environmental factor measurement means for measuring at least one environmental factor affecting said driving means; and
    driving time estimation means for estimating a driving time to drive said focus lens to said focus position based on said detected defocus amount and said at least one measured environmental factor.

13. An automatic focus device according to claim 12, wherein said at least one environmental factor comprises at least one of a power source voltage of said automatic focus device, a camera temperature, and a camera posture.

14. An automatic focus device according to claim 12, wherein said environmental factor measurement means comprises feeding time measuring means for measuring a feeding time to wind a frame of film.

15. An automatic focus device according to claim 14, wherein said environmental factor measurement means further comprises at least one sensor means for detecting said at least one environmental factor.

16. An automatic focus device according to claim 12, wherein said environmental factor measurement means comprises at least one sensor means for detecting said at least one environmental factor.

17. An automatic focus device according to claim 12, further comprising timing determination means for determining a driving starting time of at least said focus lens based on said estimated driving time.

18. An automatic focus device according to claim 17, wherein said timing determination means determines at least a mirror-up starting time, an exposure starting time, a film feed starting time, and a mirror-down starting time.

19. An automatic focus device according to claim 12, further comprising standard driving time computation means for computing a driving time for each of a plurality of predetermined defocus amounts based on said at least one environmental factor, wherein said driving time estimation means estimates said driving time corresponding to said detected defocus amount based on said plurality of predetermined defocus amounts computed by said standard driving time computation means.

20. An automatic focus device according to claim 19, wherein said standard driving time computation means computes each of said driving times for said plurality of predetermined defocus amounts based on linear and nonlinear functions that use as a parameter said at least one environmental factor.

21. An automatic focus device according to claim 20, further comprising communication means on both a lens side and a camera body side for enabling data communication between said lens side and said camera body side, wherein said standard driving time computation means is located in one of said lens side and the camera body side, and wherein said driving time estimation means is located in the other of said lens side and camera body side.

22. A method of determining a focus lens driving time for an automatic focus device, comprising:

detecting a defocus amount of a shooting lens against a subject;

measuring at least one environmental factor affecting focus lens driving;

estimating a driving time to drive said focus lens to said focus position based on said detected defocus amount and said at least one measured environmental factor;

determining a driving starting time of at least said focus lens based on said estimated driving time; and driving a focus lens to a focus position based on said defocus amount detected and said driving starting time.

23. The method according to claim 22, wherein said measuring step comprises measuring said at least one environmental factor from among a power source voltage of said automatic focus device, a camera temperature, and a camera posture.

24. The method according to claim 22, wherein said environmental factor measuring step comprises measuring a feeding time to wind a frame of film.

25. The method according to claim 24, wherein said environmental factor measuring step further comprises sensing said at least one environmental factor.

26. The method according to claim 22, wherein said environmental factor measuring step comprises sensing said at least one environmental factor.

27. The method according to claim 22, further comprising the step of determining a driving time for each of a plurality of predetermined defocus amounts based on said at least one environmental factor, wherein said driving time estimating step comprises estimating said driving time corresponding to said detected defocus amount based on said driving time for said plurality of predetermined defocus amounts.

28. The method according to claim 27, wherein said determining step comprises determining driving times for said plurality of predetermined defocus amounts based on linear and nonlinear functions using as a parameter said at least one environmental factor.

29. The method according to claim 27, further comprising converting said driving time for each of said plurality of predetermined defocus amounts into a four bit code.

30. The method according to claim 22, wherein said driving starting time determining step includes determining at least a mirror-up starting time, an exposure starting time, a film feed starting time, and a mirror-down starting time based on said estimated driving time.

31. An automatic focus device according to claim 1, wherein said environmental factor is an internal automatic focus device factor.

32. An automatic focus device according to claim 12, wherein said environmental factor is an internal automatic focus device factor.

33. The method according to claim 22, wherein said environmental factor measuring step further comprises measuring an internal automatic focus device factor.

* * * * *